Oct. 30, 1934.    J. H. LENTELL, JR    1,978,714
LUBRICATING MEANS
Filed Sept. 22, 1930

INVENTOR
JOHN HOWARD LENTELL JR.
BY
Roy M Eilers
ATTORNEY

Patented Oct. 30, 1934

1,978,714

UNITED STATES PATENT OFFICE 1,978,714

LUBRICATING MEANS

John Howard Lentell, Jr., Beloit, Wis., assignor to Fairbanks, Morse & Co., Chicago, Ill., a corporation of Illinois Application September 22, 1930, Serial No. 483,506

6 Claims. (Cl. 184—6)

This invention relates to improvements in lubricating means, and more particularly to means for lubricating bearings located in the reciprocating parts of various mechanisms, for example, the piston pin bearing in an internal combustion engine.

An object of the present invention is to provide an improved lubricating means of the type described, in which the movement of the reciprocating mechanism is utilized for the purpose of directing a flow of oil directly to the parts to be lubricated.

A further object is to provide lubricating means for the purpose noted, which are simple and positive in operation, economical to construct and maintain and which will provide ample lubrication of parts which ordinarily it is not practical to lubricate directly by force feed systems.

A still further object is to provide an improved lubricating means for the piston pin of an internal combustion engine, which is carried entirely by the piston, and which supplies lubricant directly and positively to the interior of a hollow piston pin.

Figure 1:
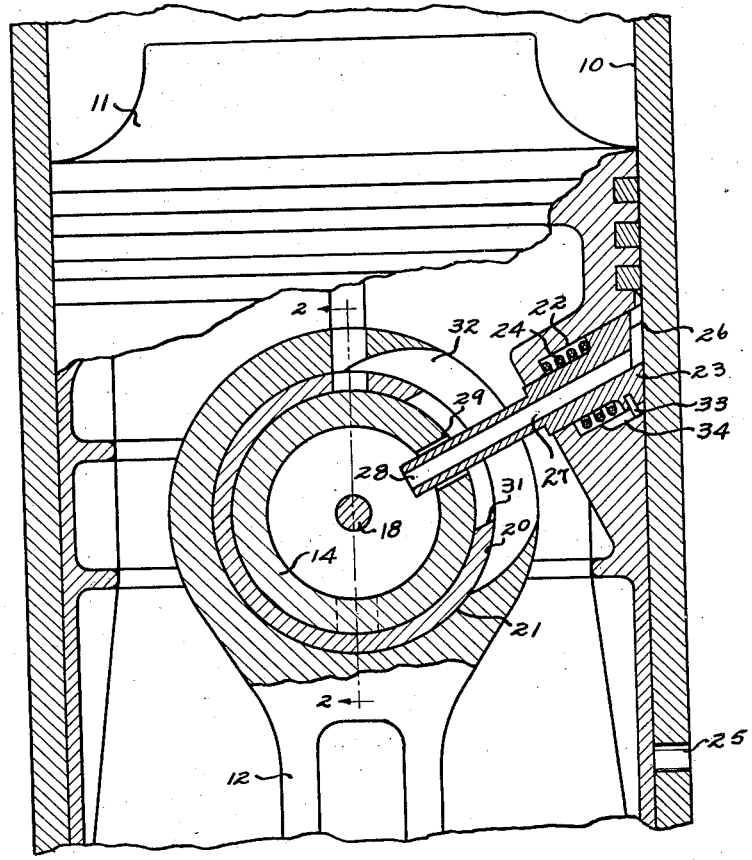
Figure 2:
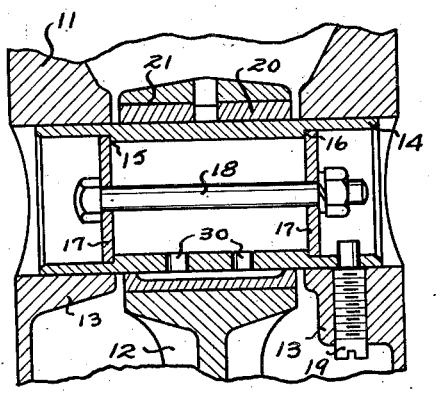
Figures 3, 4:
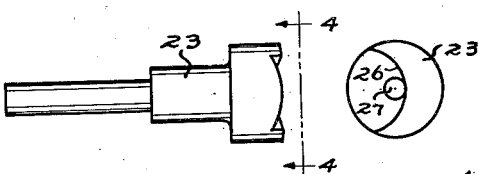

Further objects and advantages will appear from the following detailed description of parts and the accompanying drawing, in which:

Fig. 1 is a fragmentary sectional elevation of an internal combustion engine to which the present improvements are applied; Fig. 2 is a sectional elevation taken along the line 2—2 in Fig. 1; Fig. 3 is a side elevation of the improved scraper element, and Fig. 4 is an end elevation of the scraper element, as viewed from line 4—4 in Fig. 3.

It will, of course, be understood that the present detailed description of parts and the accompanying drawing relate to a single preferred executional embodiment of the invention, and that substantial changes may be made in the described arrangement and construction of parts without departing from the spirit and full intended scope of the disclosure.

Referring by numerals to the drawing, 10 represents the cylinder wall of an internal combustion engine, in which a piston 11 of any suitable form is operatively associated with a connecting rod 12. The piston 11 is provided with inwardly extending bosses 13, which are bored to receive a piston pin 14. This pin is, by preference, formed hollow, as indicated at 14, and is provided with shouldered portions 15 and 16 which receive end closure members 17 secured in spaced and oil tight relation within the pin by means of a bolt 18. The piston pin 14 is removably attached to the piston 11 by means of a threaded member 19 which prevents the pin from endwise or rotary movement within the piston. A bushing 20 is fixedly secured in the eye 21 of the connecting rod 12 and provides a bearing surface for rotary movement about the fixed piston pin 14.

The piston 11 is provided on its outer wall portion with a recess 22 for receiving a scraper element 23, which is pressed into oil collecting contact with the wall 10 of the cylinder. This scraper element is urged into scraping association with the cylinder wall by means of a spring 24 which is disposed within the recess 22. Oil is supplied to the walls of the cylinder in any suitable manner through an opening 25 which is disposed in the path of the scraper element. The scraper element is provided with a scraper edge 26 which is so formed as to direct the oil scraped from the wall, directly into a passage 27 formed in the scraper. The scraper element and associated parts are so disposed within the recess 22 as to provide a substantial angle or inclination of the passage 27, with respect to a transverse plane through the cylinder, to permit ready and positive flow of the oil through the passage to its delivery end opening 28. The delivery passage from the scraper element extends definitely into the interior of the hollow pin 14 by way of an opening 29, drilled transversely into the pin 14.

It will be readily seen that oil scraped from the wall of the cylinder is conveyed through the tubular portion 27 of the scraper element, directly into the interior of the hollow pin 14. The pin is further provided with openings 30 for delivering the oil to the moving pressure surface between the pin 14 and bushing. The oil delivered to the interior of the pin is prevented from flowing out the ends of the hollow pin by means of the members 17 which trap the oil within the pin and insure the delivery of oil to the openings 30.

It will be readily understood that the pin 14 is fixed to the piston, and therefore the reciprocating movement of the piston does not interfere with the disposition of the discharge end of the scraper element directly within the pin. However, since the bushing and eye portions of the connecting rod are rotated angularly about the pin, the bushing is for this reason provided with a slotted portion 31; also the connecting rod eye is provided with a similar slot 32 in order to insure the proper clearance between the scraper element and these moving portions, so that there is no possible interference between the coacting parts when the rod oscillates upon the pin 14.

It will be readily seen that by the present provision, all of the oil scraped from the walls of the cylinder is positively conveyed to the part to be lubricated without any possible waste. It will appear that the scraper element is permitted a resiliently opposed, endwise movement, due to the spring, which tends to urge the scraper against the wall 10. The scraper is prevented from rotating within the piston by the provision of a pin 33, which is free to slide in a slot 34, provided in the wall of the piston.

The scraper element is so arranged that its discharge end 28 is disposed within the interior hollow portion of the pin, in order to insure the delivery of oil always to the interior of the hollow pin, and not to any external portion of the assembly where it might be wasted or utilized to doubtful advantage.

I claim as my invention:

1. In a wrist pin lubricating device adapted to be carried by a reciprocating member and to secure its supply from a lubricated surface, a wrist pin attached to said member, and having a bore therethrough, provided with internal shoulders, disks for closing the bore of said pin, near its ends, to form a lubricant receiving chamber in the pin, a bolt engaging said disks, for assembly thereof to the pin, a bearing for said pin, said bearing being supplied with lubricant from said chamber; means for supplying lubricant to said chamber, comprising a scraper member disposed above and spaced substantially from said receiving chamber, and adapted to remove lubricant from the surface over which it slides, and a conduit connecting said scraper member and receiving chamber, for conveying the removed lubricant directly to said chamber, said conduit being disposed at an acute angle to the said lubricated surface.

2. In a wrist pin lubricating device adapted to be carried by a vertically reciprocating member and to secure its supply from a vertical lubricated surface, a hollow wrist pin carried by said member, the space within said pin forming an oil reservoir, lubricant-tight closures at the ends of the oil reservoir within said pin, a bearing adapted to oscillate on said pin, means for supplying said bearing with lubricant, said last named means including a scraper member adapted to remove lubricant from the surface over which it slides, and disposed above said oil reservoir, and a conduit carried by said scraper, said pin and bearing being provided with transverse wall openings intermediate their ends, the wall opening in the bearing being elongated circumferentially, to permit oscillation of the bearing, said conduit projecting uninterruptedly and downwardly from the scraper through certain of said openings to supply scraped-off lubricant to the interior of said pin.

3. In an engine including a cylinder, a piston operable therein, and a hollow piston pin forming a reservoir for oil, an apertured, recessed projection extending inwardly of the piston, a hollowed oil scraper member guidingly disposed in the aperture in said projection, and having an oil scraping surface disposed above said oil reservoir, a spring disposed about said scraper member within the recess of said projection, and arranged to urge the scraper member into operative contact with the wall of the cylinder, and an elongated conduit extending downwardly from the scraper member, beyond said projection and adapted to conduct oil to a point within the reservoir of the piston pin.

4. In an engine including a piston, cylinder, connecting rod and piston pin, an oiling device for the piston pin, carried by the piston and adapted to secure its supply from an oiled cylinder surface, the piston pin being of hollow construction and substantially oil-tight, except for oil supply and discharge channels provided therein, an oil scraper carried by the piston and including a recessed scraper surface, a spring resiliently urging said scraper toward the cylinder wall, a discharge tube for scraped-off oil, said tube extending from the scraper, transversely into a wall of the piston pin and extending to a point substantially within the interior thereof, means for preventing rotational movement of said scraper, means securing the pin against movement within the piston, said connecting rod having a portion near said discharge tube formed to clear said tube during oscillation of the rod.

5. In an engine including a cylinder, a piston operable therein and a chambered piston pin, a one-piece oil scraper carried by the piston inclined with respect to a transverse plane therethrough, and disposed above the chamber in the pin, the scraper having an oil-collecting recess formed in the face thereof, a conduit extending axially of the scraper and having its inlet end in said recess and its discharge end extended substantially laterally of, and to a point well within the interior of said hollow piston pin, a recessed and apertured boss formed by the piston wall, with said conduit extending through the aperture thereof, and a spring disposed in the recess, and arranged for urging the scraper toward the cylinder wall, the boss constituting a guide for the scraper and conduit, and a seat for said spring.

6. In an engine including a cylinder, a piston operable therein, a connecting rod, and a hollow open-end piston pin, closures for the ends of the piston pin, shouldered portions in the pin, adapted to receive and space said closures from each other to form a chamber within the pin, a bolt extending through said closures adapted to position them in assembled relation with respect to the pin, the piston pin being provided with discharge openings from the chamber in said pin, directed to a bearing surface exterior of the pin, means for positioning the pin against rotative and endwise movement within the piston, a scraper element carried by the piston at a point above the piston pin chamber, a conduit portion integral with the scraper, and extending radially of the piston pin and downwardly to a point inside of said piston pin chamber, and means for yieldingly urging said scraper member into oil-collecting engagement with the cylinder wall, the pin, scraper and conduit being substantially stationary with respect to the piston, and providing a continuous oil passage from the cylinder wall to said piston pin chamber, the connecting rod being laterally slotted adjacent the pin bearing, to receive said conduit portion, and permit oscillation of the rod independently of the conduit or connected portion.

JOHN HOWARD LENTELL, Jr.